Dec. 15, 1942.    R. L. ADAMS    2,305,399
VEHICLE WALL CONSTRUCTION
Filed Sept. 21, 1939    3 Sheets-Sheet 1
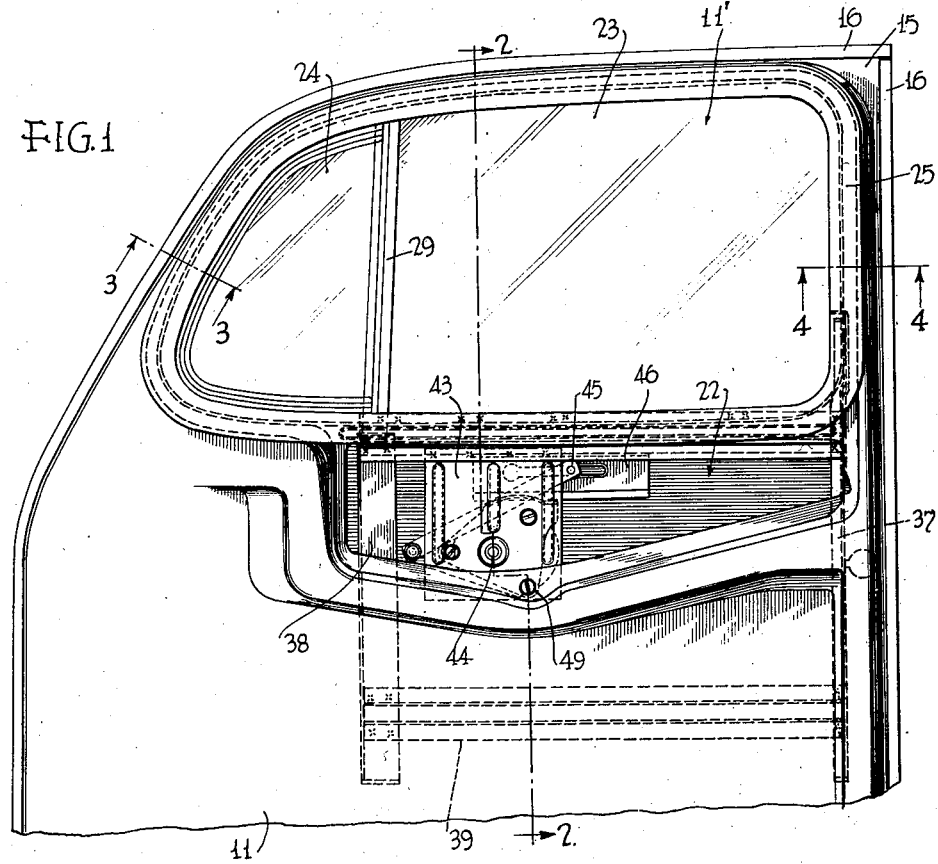
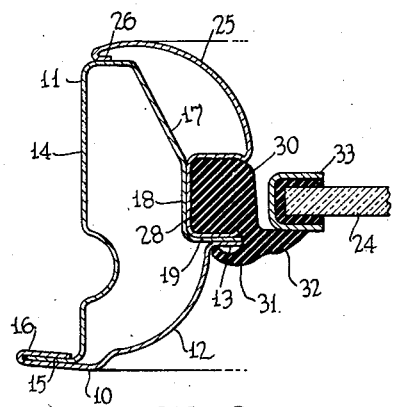
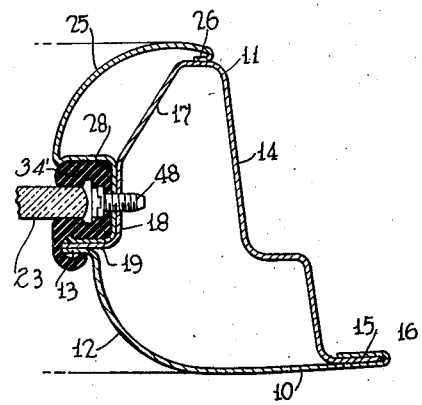
INVENTOR
Ralph L. Adams.
BY John P. Tarbox
ATTORNEY

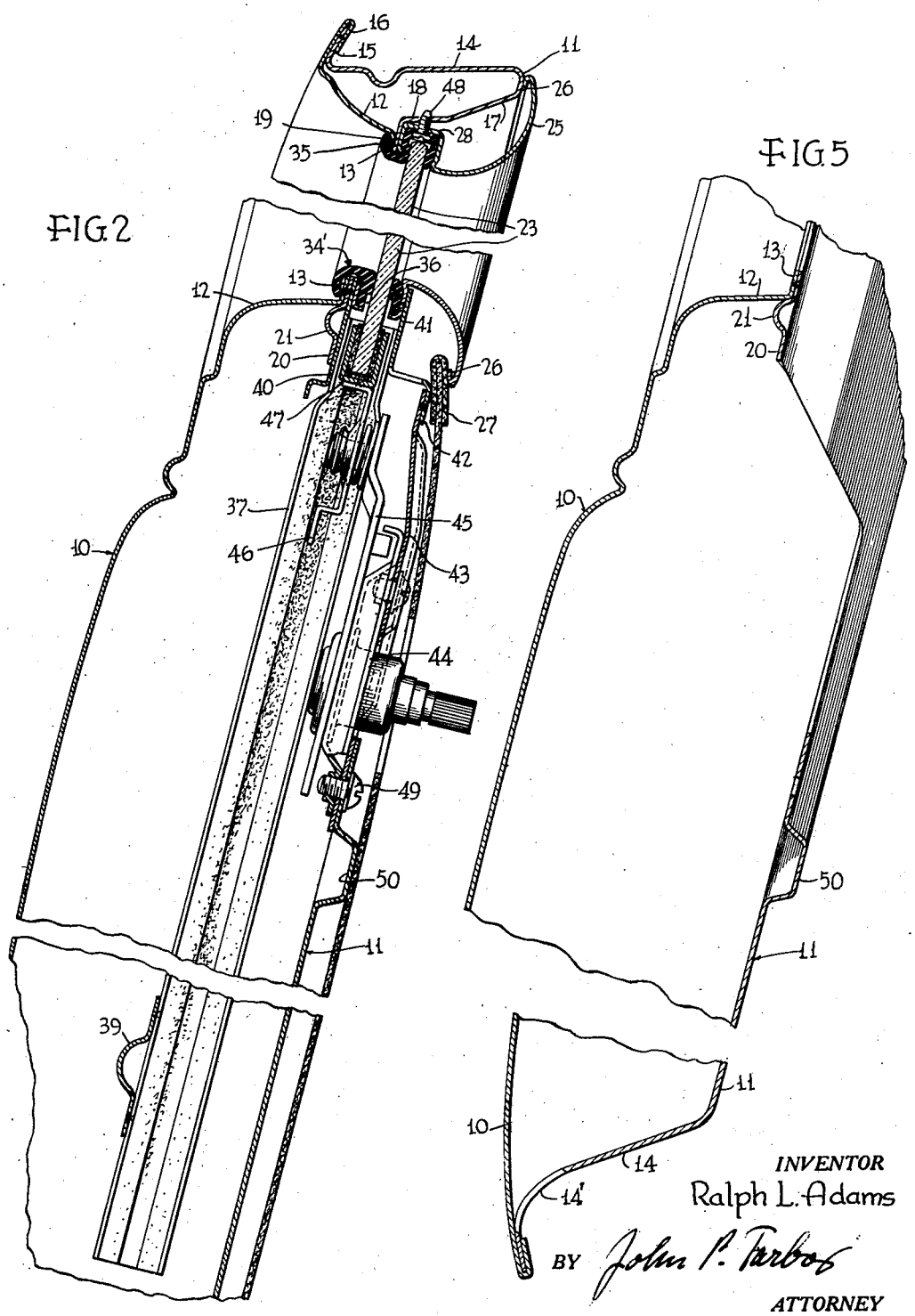

Dec. 15, 1942.   R. L. ADAMS   2,305,399
VEHICLE WALL CONSTRUCTION
Filed Sept. 21, 1939   3 Sheets-Sheet 3
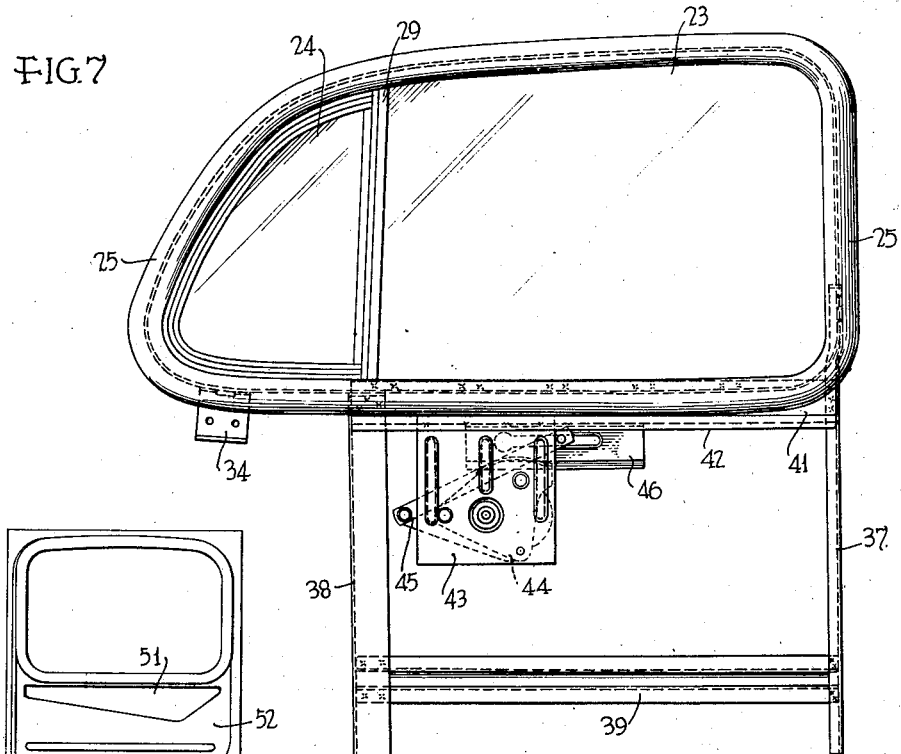
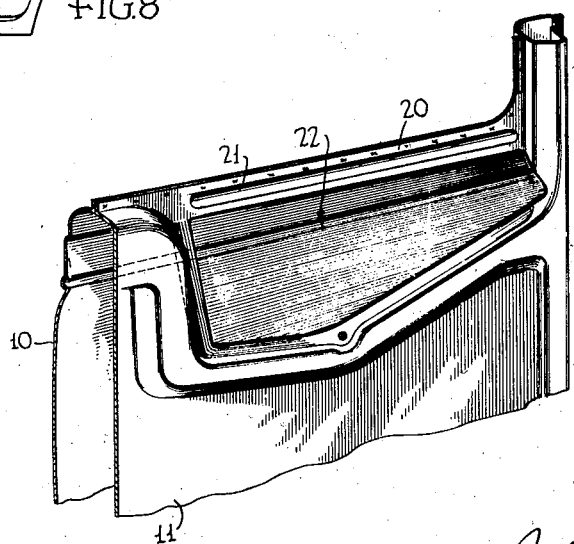
INVENTOR
Ralph L. Adams.
BY John P. Tarbox
ATTORNEY Patented Dec. 15, 1942

2,305,399

UNITED STATES PATENT OFFICE 2,305,399

VEHICLE WALL CONSTRUCTION

Ralph L. Adams, Moylan, Pa., assignor to Edward G. Budd Manufacturing Company, Philadelphia, Pa., a corporation of Pennsylvania Application September 21, 1939, Serial No. 295,931

12 Claims. (Cl. 296—44)

The invention relates to a vehicle wall structure, such as a vehicle door, and more particularly to such a structure comprising inner and outer panels being spaced from each other and having a slidable closure member such as a window arranged between them.

It is among the objects of the invention to provide an improved form of such structures which is light in weight yet strong, the parts of which may easily and cheaply be manufactured preferably as sheet metal stampings, which comprises but comparatively few parts, the parts of which are adapted for easy assemblage into the final structure and which after the final assemblage needs only little or no finishing operations.

It is furthermore among the objects of the invention to provide a structure which lends itself to be used in combination with a separately assembled closure member unit or window unit which unit may comprise parts related to the window such as a garnish moulding, guide channels, and a regulator mechanism.

Further advantages and objects of the invention and the features thereof will become apparent from the embodiment shown in the attached drawings and from the following description of such embodiment.

In the drawings:

Fig. 1 is an inside view of an automobile door, the lowermost portion being broken away.

Figs. 2, 3 and 4 are sections taken respectively along the correspondingly numbered lines of Fig. 1 and view in the direction of the arrows on such lines.

Fig. 5 is a section corresponding to Fig. 2 yet showing only a portion of the inner and outer panel without the other parts of the door.

Fig. 6 is a perspective fragmentary inside view of the inner and outer door panel.

Fig. 7 is an inside view of the window, garnish moulding, window guide and window regulator unit, ready for insertion into the door structure proper.

Fig. 8 is a diagrammatical inside view on a more reduced scale of a rear door for an automobile corresponding to the front door shown in the preceding figures.

The door structure proper, shown in the drawings, consists essentially of an outer panel 10 and an inner panel 11, both of which are one piece sheet metal stampings and surround a window opening 11'. The outer panel 10 is provided around the window opening with an inwardly extending flange or moulding 12 which ends in a narrow flange 13, this flange being about parallel to the main body of the panel. The inner panel 11 is provided along its outer margins with an outwardly directed flange 14 which forms the web of the door frame and which ends in the usual overlap flange 15 around which the margin 16 of the outer panel is crimped. As indicated in the lower part of Fig. 5, the lower marginal portion of the panel 11 and of the flanges 14 and 15 form an S-shaped cross section and at the junction of said two flanges one or more drain holes 14' are cut out in a direction about perpendicular to the main body of the panel.

Along the marginal portion of the window opening, the inner panel 11 is provided with an inclined flange 17, which is continued by a flange 18, the latter being arranged about vertical to the main plane of the panel, and which ends in a flange 19 and a portion 20, which extend about parallel to the main portion of the panel. Flanges 13 and 19 and portion 20 of the outer and inner panels respectively are connected to each other such as by electrical spot welding.

The flange 19 together with the web shaped portion 20 of the inner panel extend completely around the window opening, the member 20 being reinforced by an outwardly pressed out beading 21 which serves at the same time as a shoulder against which the edge between the flanges 12 and 13 of the outer panel may rest. The upper marginal part of the portion 20 rests against and is fastened to the flange 13 in the same manner as the flange 19. The portion 20 is separated from the main portion of the panel 11 by an opening or slot 22. As clearly visible from Figs. 5 and 6, this slot extends in transverse direction over the region which would be taken by a continuation of the flanges 17 and 18 if those flanges would extend all around the window opening; besides this slot 22 extends into the upper part of the main body of the inner panel. As shown in Figs. 1 and 6, the opening 22 extends in longitudinal direction over a part only of the width of the door for a purpose which will become apparent in the further course of this description.

Window panes 23 and 24 serve for closing the window opening 11' which is provided in the door structure as formed by the above described inner and outer panels. These window panes are not separately assembled with the door structure proper but as a unit shown in Fig. 7. This window unit comprises additionally the supporting and guiding means for the window panes, an inner garnish moulding and a window regulator mechanism. The garnish moulding 25 of this unit extends continuously around the entire window opening and may be of any conventional or desired cross section. Along its outer lateral margin, this rail 25 is provided with a reversely bent flange 26 which is adapted to rest against the marginal inner surface of the inner door panel 11 or against a marginal portion of an upholstery plate 27 respectively.

Along its outer margin the garnish moulding 25 is provided with a channel structure 28 the mouth of which faces toward the middle of the window opening. A rib 29 is arranged between the window panes 23 and 24. This rib is in the form of two channels which latter have their mouths facing toward the middle of the window panes 23 and 24 respectively, so that these channels form continuations of the channel 28. The channel around the opening for the window 24 is provided with a weatherstrip 30. This weatherstrip covers by an outer tongue or lip 31 the flanges 13 and 19 of the door panels. Another lip or tongue 32 of the weatherstrip forms an abutment against which the frame 33 of the window pane 24 may rest. The window 24 is mounted in the garnish moulding swingably about more or less vertical pins, as it is well known in present day automobiles, by means of its frame 33 and by means of additional members (not shown). The lower bearing for one of said pins may be formed in a bracket 34 which is permanently fastened to the garnish moulding and which serves simultaneously as a connecting means between the window unit and the door structure proper.

The channel 28 and the channel in the rib 29 facing toward the middle of the window 23 is provided with a channel shaped weatherstrip 34'. This strip is likewise provided with a lip or tongue 35 similar to the tongue 31 of the strip 30 and serving for the same purpose as the latter. The lower horizontal portion of the channel 28 and of the weatherstrip 34 is slotted at 36 as to allow the passage of the vertically slidable window pane 23 therethrough. The vertical portion of the window guide channel 28 is connected to and downwardly extended by a separately manufactured channel member 37 and the rib 29 is downwardly extended by another channel member 38 which is likewise connected to the inner garnish moulding. The lower end portions of these members 37 and 38 are connected by a cross member 39 which is arranged and fastened to the outer walls of said channel members. Immediately below the window opening, a horizontal rail 40 is arranged on the outer side of the path of the window pane 23 and is fastened to portions of the outer walls of the window guide channels 28, 37 and 38. The lower margin of this member 40 is flanged as shown so as to increase its strength. On the inner side of the path of the window pane a similar reinforcing rail 41 being Z-shaped in cross section is arranged and fastened to the inner walls of the channels 28, 37 and 38. The inner downwardly depending flange 42 of this member serves for the attachment of a downwardly depending plate 43 which in turn serves for the attachment of a window regulator 44 of any convenient or desired construction. This window regulator acts upon the window pane 23 in any well known or desired manner as by means of an arm 45 and a rail 46 which latter is attached to a channel member 47 being rigidly secured to the lower margin of the window pane 23.

After the door structure proper has been assembled from the outer and inner panel, has been painted and finished and after the window unit as shown in Fig. 7 has been assembled separately on a bench or separate assembly line and also painted and finished, the lower part of the window unit is inserted into the door through the slot 22 and then the two units are connected to each other by screws 48 passing through the bottom wall of the channel 28 and the flange 18 of the inner panel, by a screw 49 passing through the main body of the inner panel 11, the plate 43 and the base plate of the regulator 44, and furthermore by screws or bolts (not shown) connecting the bracket 34 to the main portion of the inner panel 11. The upper margin of the upholstery plate 27 is slid into the slot between the lower flange 26 of the moulding 25 and the rail 41 and 42. The plate 27 is additionally fastened to the inner panel 11 at other points in any convenient manner and it is partly supported by a rib 50 pressed from the panel 11.

As diagrammatically shown in Fig. 8, the rear door differs from the front door mainly therein that the slot 51 in the inner panel 52 extends nearly over the entire width of the door corresponding to a correspondingly wide slidable window (not shown) and in view of the absence of a swingable window. Of course, the window unit for the rear door will also in its lower part extend nearly over the entire width of the door and will not be subdivided by a rail 29 but besides there does not need to be any basic differences as compared with the window unit for the front door shown in Figure 7.

The outer door panels may be manufactured in any known or desired manner. The inner panels are preferably stamped to the desired form before the window opening 11', the slot 22 and the drain holes 14' are cut out. The formation of those openings is preferably effected simultaneously by cutting tools acting in a direction about perpendicular to the main plane of the inner panel. Owing to the fact that both panels, the inner and the outer, are substantially free from undercut portions, they are easily manufactured by means of very simple stamping dies.

It should be borne in mind that the invention is not restricted to the details of the shown embodiment but that many modifications falling within the spirit of the invention and being intended to be covered by the following claims could easily be designed by those skilled in the art. The panels, for instance, have not necessarily to be one piece stampings or from sheet metal. Furthermore, the main idea of the invention of having a bridge member, which belongs to the inner panel or panel unit and is arranged on the outer side of the window pane, thereby leaving an opening for the insertion of a window or window unit, may be made use of for other types of doors, for instance for a door the main body of which extends to the lower edge of the window opening only, whereas the upper portion of the window frame is formed by one or more separate members. It may also be emphasized that the invention is by no means restricted to vehicle doors but could easily be applied to other portions of a vehicle wall, for instance to the region of the rear quarter side window. Moreover, the invention is not necessarily restricted to be used in combination with windows which are to be raised and lowered but may be used in connection with laterally slidable windows. These indicated modifications and other modifications are, as stated before, intended to be covered by the language of the following claims.

What I claim is:

1. In a vehicle wall structure such as a door, an outer panel, an inner panel, the main bodies of said two panels being arranged in general about parallel to and spaced from each other, the space between the panels being adapted for the accommodation of a slidable closure member such as a window, one of said panels having a portion transversely offset in a direction toward the other panel, an opening between said offset portion and the main portion of the panel to which it belongs, said opening being adapted for the passage of said closure member therethrough.

2. In a structure according to claim 1, said offset portion and the main portion of said one panel being connected to each other by portions extending transversely to the plane of the main body of the panel and being arranged at opposite ends of said opening.

3. In a structure according to claim 1, said offset portion and the main portion of said one panel being connected to each other by web shaped portions being arranged substantially perpendicular to the main body of the panel and to the opening, said web shaped portions being furthermore arranged at opposite ends of said opening.

4. In a structure according to claim 1, said offset portion being substantially web shaped and being arranged substantially parallel to the main plane of a closure member to be slid through said opening.

5. In a vehicle wall structure such as a door, an outer panel, an inner panel, the main bodies of said two panels being arranged about parallel to and spaced from each other, means for accommodating a slidable closure member such as a window in the space between said outer and said inner panel, at least one of said two panels being provided with a portion which extends toward the other panel, a slot in said portion adapted for reciprocal movements of a closure member such as a window therethrough.

6. In a vehicle wall structure such as a door, a window opening, an outer panel, an inner panel, the main bodies of said two panels being arranged about parallel to and spaced from each other, means for accommodating a slidable window between said outer and inner panel, said inner panel being outwardly bent off along at least one margin of said window opening, the outwardly bent off portion of said inner panel being slotted as to permit the passage of said window therethrough.

7. In a vehicle wall structure such as a door, an outer panel, an inner panel, the main bodies of said two panels being arranged about parallel to and spaced from each other, said two panels being provided each with a window opening registering with the opening in the other panel, an outwardly directed flange along the margin of the window opening in said inner panel, an inwardly directed flange along the margin of said outer panel, said two flanges meeting and being fastened to each other, said flange of said inner panel being slotted along one side of said window opening as to permit the passage of a slidable window therethrough.

8. In a structure according to claim 6, said outwardly bent off portion being provided along its outer margin with a flange extending in a direction about parallel to the direction of the main bodies of said panels.

9. In a structure according to claim 6, said slot being of such a width as to permit the insertion therethrough of the lower portion of a window unit, said unit comprising besides the window pane proper other members related to the window such as window guides, a window regulator and a garnish moulding.

10. In a structure according to claim 6, said slot extending into the main portion of said panel as to allow its being cut out in a direction perpendicular to the main plane of such panel.

11. In a vehicle wall structure such as a vehicle door, a lower part adapted to receive a reciprocably slidable closure member, a frame, said frame having a horizontal portion along the upper margin of said lower part, said portion being generally Z-shaped in cross section, the web of said portion extending from the inner surface of the structure toward the outer surface thereof and being slotted along at least a part of its length so as to allow a closure member such as a window to be reciprocably moved into and out of said frame between the two arms of said frame portion, the outer arm of the portion extending upwardly and the inner arm thereof extending downwardly.

12. In a vehicle wall structure such as a door, a two-part window, the one part of which being reciprocably slidable into an open and a closed position respectively, a panel having its main portion arranged on the one side of said window plane and bent off portions arranged on the other side of the window plane, a portion connecting said first named portions of said panel and extending transversely to the plane of the window, said transversely extending portion being substantially uninterrupted throughout except in the region of said slidable window part where it is slotted as to allow such window part to pass therethrough.

RALPH L. ADAMS.